United States Patent
Takahashi

(10) Patent No.: US 12,157,253 B2
(45) Date of Patent: Dec. 3, 2024

(54) METHOD FOR PRODUCING MOLD FOR TIRE VULCANIZATION AND MAINTENANCE METHOD

(71) Applicant: The Yokohama Rubber Co., LTD., Tokyo (JP)

(72) Inventor: Yukihisa Takahashi, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 45 days.

(21) Appl. No.: 17/905,294

(22) PCT Filed: Feb. 4, 2021

(86) PCT No.: PCT/JP2021/004068
§ 371 (c)(1),
(2) Date: Aug. 30, 2022

(87) PCT Pub. No.: WO2021/176943
PCT Pub. Date: Sep. 10, 2021

(65) Prior Publication Data
US 2023/0127517 A1  Apr. 27, 2023

(30) Foreign Application Priority Data

Mar. 4, 2020 (JP) ................................ 2020-036369

(51) Int. Cl.
*B29C 33/38* (2006.01)
*B22D 19/00* (2006.01)
(Continued)

(52) U.S. Cl.
CPC .......... *B29C 33/3842* (2013.01); *B22D 19/00* (2013.01); *B22D 25/02* (2013.01);
(Continued)

(58) Field of Classification Search
USPC ........................................................ 264/219
See application file for complete search history.

(56) References Cited

FOREIGN PATENT DOCUMENTS

| JP | S62-199242 A | 9/1987 |
| JP | H10-034658 A | 2/1998 |

(Continued)

OTHER PUBLICATIONS

Shirato, S., Machine-translation to English of JP-2008247001-A with full foreign patent application attached, B29C33/02, Oct. 16, 2008. (Year: 2008).*

(Continued)

*Primary Examiner* — S. Behrooz Ghorishi
*Assistant Examiner* — Gregory C. Grosso
(74) *Attorney, Agent, or Firm* — Thorpe North & Western

(57) ABSTRACT

Provided are a method for producing a tire vulcanization mold and a maintenance method. A positioning member protrudes at a position corresponding to a position on a master mold surface. A positioning hole is formed by a tip end of the positioning member in a rubber mold to which the surface of the master mold is transferred. The tip end is embedded in the positioning hole so that a rear end protrudes from the surface of the rubber mold. The rear end is embedded in a plaster mold to which the surface of the rubber mold is transferred. A case is detachably fixed to the tip end protruding from the surface of the plaster mold. The case is cast into a mold to which the surface of the plaster mold is transferred and fixed. A valve body is inserted into the case from which the positioning member is removed.

1 Claim, 13 Drawing Sheets

(51) Int. Cl.
*B22D 25/02* (2006.01)
*B29C 33/10* (2006.01)
*B29C 33/72* (2006.01)
*B29D 30/06* (2006.01)

(52) U.S. Cl.
CPC .............. *B29C 33/10* (2013.01); *B29C 33/72* (2013.01); *B29D 30/0606* (2013.01); *B29D 2030/0617* (2013.01)

(56) References Cited

FOREIGN PATENT DOCUMENTS

| | | |
|---|---|---|
| JP | 2000-102926 A | 4/2000 |
| JP | 2002-234033 A | 8/2002 |
| JP | 2005-131685 A | 5/2005 |
| JP | 2008-247001 A | 10/2008 |
| JP | 2015-020297 A | 2/2015 |
| JP | 2017-013312 A | 1/2017 |
| JP | 2017-128013 A | 7/2017 |

OTHER PUBLICATIONS

Ahn, M. et al., Machine-translation to English of JP-2004034691-A with full foreign patent application attached, B29C33/10, Feb. 5, 2004. (Year: 2004).*

Shirato, S., Machine-translation to English of JP-2008247001-A with full foreign patent application attached, B29C33/02, Oct. 16, 2008. Previously entered as an NPL file on Apr. 4, 2024. (Year: 2008).*

Ahn, M. et al., Machine-translation to English of JP-2004034691-A with full foreign patent application attached, B29C33/10, Feb. 5, 2004. Previously entered as an NPL file on Apr. 4, 2024. (Year: 2004).*

* cited by examiner

METHOD FOR PRODUCING MOLD FOR TIRE VULCANIZATION AND MAINTENANCE METHOD

TECHNICAL FIELD

The present technology relates to a method for producing a tire vulcanization mold and a maintenance method therefor and particularly relates to a method for producing a tire vulcanization mold enabling accurate and efficient installation of a vent unit at a predetermined position on a tire molding surface of the tire vulcanization mold and a maintenance method enabling efficient maintenance of the vent unit.

BACKGROUND ART

Installing a vent unit in an exhaust hole that opens to a tire molding surface in order to discharge unnecessary air and the like between a green tire and the tire molding surface to the outside of the mold is known (see, for example, Japan Unexamined Patent Publication No. 2017-013312 A). When the vent unit is installed in a mold, the vent unit is formed at a predetermined position on the tire molding surface, and then the vent unit is pressed into the exhaust hole from the opening of the tire molding surface and fixed.

An exhaust hole is formed by a drill or the like, but high-precision processing technology is required to accurately form the exhaust hole at a predetermined position on the tire molding surface according to target specifications. Therefore, it takes a considerable amount of time and effort to form a large number of exhaust holes. High accuracy is also required to position the vent unit in the exhaust hole. Furthermore, since the mold is made of a material with relatively low hardness such as aluminum, even if the exhaust hole is formed at a predetermined position, the vent unit will be displaced if the vent unit is not attached correctly. Therefore, there is room for improvement in accurately and efficiently installing the vent unit at a predetermined position on the tire molding surface.

Since contaminants adhere to the vent unit due to repeated use of the mold, it is necessary to perform maintenance work such as removing the contaminants. For example, in order to remove a contaminant, a method of moving and controlling cleaning means to the position of a vent hole has been proposed (see Japan Unexamined Patent Publication No. 2017-128013 A). Japan Unexamined Patent Publication No. 2017-128013 A proposes using the CAD (computer-aided design) data of a tire molding surface as the position of an exhaust hole stored in advance (paragraph 0025), but it is not guaranteed that the vent hole has been accurately installed at the position of the vent hole in the CAD data. Further, it has been proposed that the position of the vent hole be calculated by the control means by comparing the shape information stored in advance of the molding surface including the position of the vent hole with the shape of the molding surface obtained by detection means. However, it is unclear how the position of the vent hole can be accurately determined as a result of the comparison. Furthermore, it takes a lot of time to detect the position of the vent hole by the detection means each time the vent hole is cleaned. Therefore, there is room for improvement in efficiently maintaining the vent unit.

SUMMARY

The present technology provides a method for producing a tire vulcanization mold enabling accurate and efficient installation of a vent unit at a predetermined position on the tire vulcanization mold and a maintenance method enabling efficient maintenance of the vent unit.

A method for producing a tire vulcanization mold according to the present technology is a method for producing a tire vulcanization mold, including: producing a master mold having a same surface shape as a tire surface to be produced, subsequently producing a rubber mold to which a surface of the master mold is transferred, subsequently casting a plaster mold to which a surface of the rubber mold is transferred, subsequently casting a mold to which a surface of the plaster mold is transferred, and subsequently installing a vent unit at a predetermined position on a tire molding surface of the mold. A tip end of a positioning member at an attachment position corresponding to the predetermined position on the surface of the master mold is installed protruding, the rubber mold is produced using the master mold so that a positioning hole is formed in the rubber mold by the tip end, the tip end is embedded in the positioning hole with a rear end of the positioning member protruding from the surface of the rubber mold, the plaster mold is produced using the rubber mold so that the rear end is embedded in the plaster mold with the tip end protruding from the surface of the plaster mold, a case that constitutes a vent unit is detachably fixed to the tip end, the vulcanization mold is cast using the plaster mold so that the case is cast and fixed to the vulcanization mold, and a valve body that constitutes the vent unit is inserted and attached to the case removed from the positioning member so that the tire molding surface is installed in the vent unit.

A maintenance method for a tire vulcanization mold according to the present technology is a maintenance method for a tire vulcanization mold for performing maintenance of the vent unit installed in the tire vulcanization mold produced according to the method for producing the tire vulcanization mold, the method including: storing position data of the attachment position in the master mold in a storage unit; and moving a head of a maintenance mechanism based on the position data of the attachment position stored in the storage unit when performing maintenance of the vent unit.

According to the method for producing the tire vulcanization mold of the present technology, at the first stage of the process of producing the tire vulcanization mold, the tip end of the positioning member is installed at the attachment position corresponding to the predetermined position on the surface of the master mold so as to protrude. The case that constitutes the vent unit can be cast into the vulcanization mold and fixed at the predetermined position with high accuracy using the positioning member. Then, by inserting and attaching the valve body to the case from which the positioning member detachably fixed to the rear end has been removed, the vent unit can be attached to the predetermined portion on the tire molding surface with high accuracy without requiring a large number of man-hours.

According to the maintenance method for the tire vulcanization mold of the present technology, the position data of the attachment position stored in the storage unit indicates the same position as the position data of the predetermined position on the tire vulcanization mold for fixing the vent unit.

Therefore, by moving the head of the maintenance mechanism based on the position data of the attachment position stored in the storage unit when performing maintenance of the vent unit, the head can be positioned at the predetermined position at which the vent unit is installed. In this way, the head can be quickly moved to the position where the vent unit is installed and necessary maintenance work can be performed without performing processes such as detecting the position of the vent unit each time maintenance is performed.

DETAILED DESCRIPTION

Figure 1:
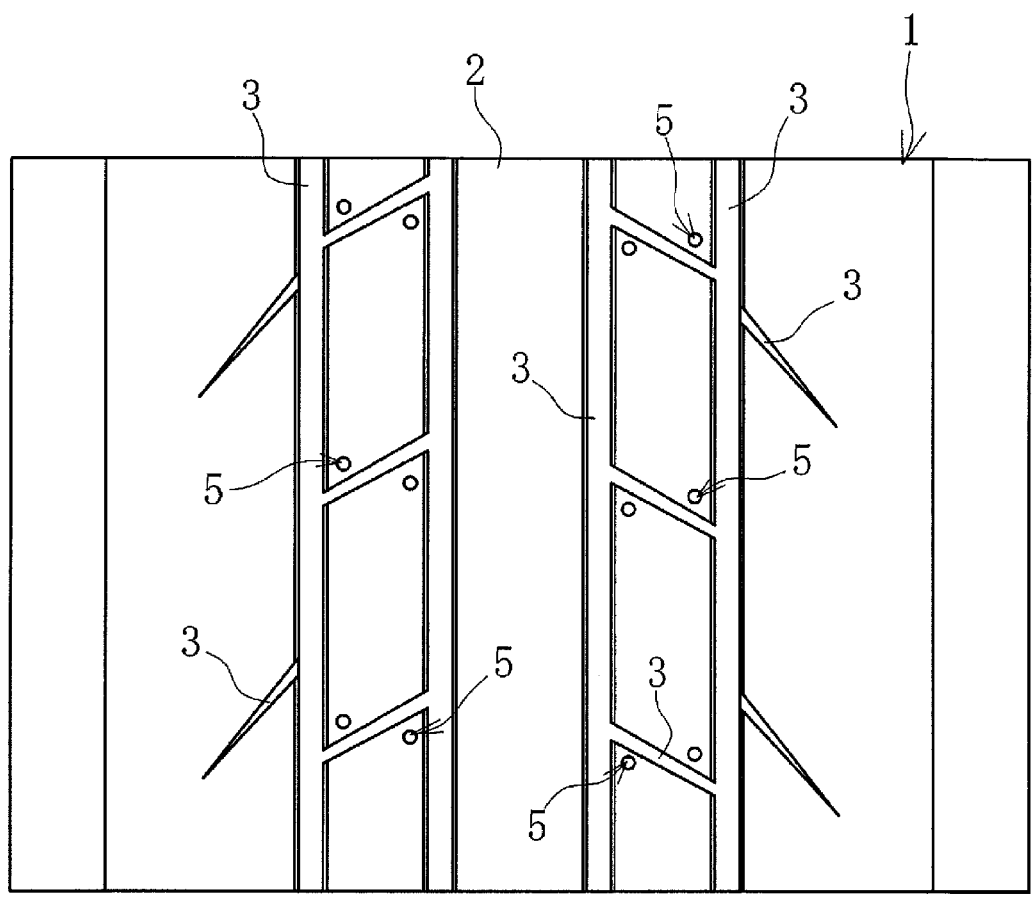
FIG. 1 is an explanatory diagram illustrating a tire vulcanization mold produced by the present technology in a plan view.

Hereinafter, a method for producing a tire vulcanization mold and a maintenance method therefor of the present technology will be described based on the embodiment shown in the drawings.

Figure 2:
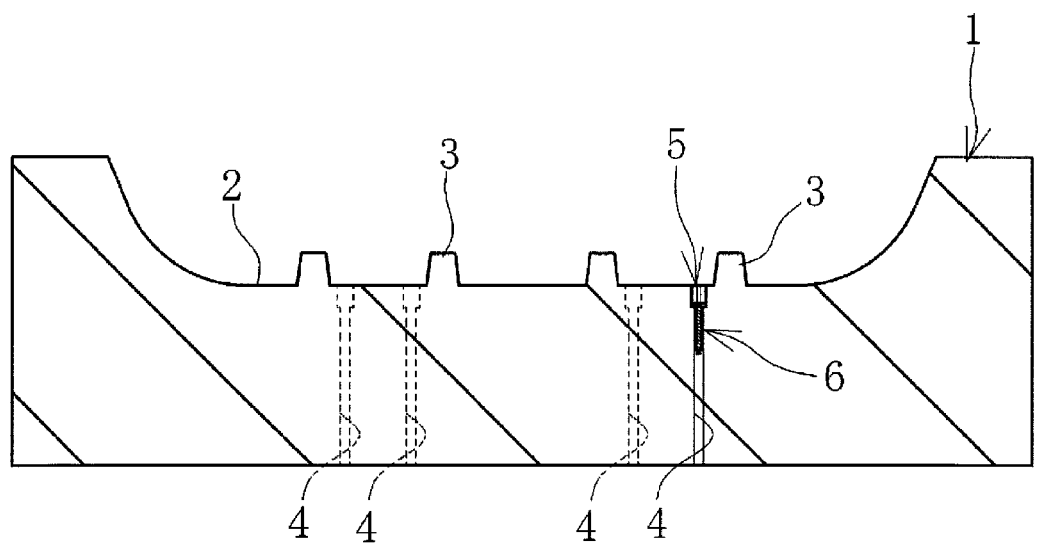
FIG. 2 is an explanatory diagram illustrating the mold of FIG. 1 in a cross-sectional view.
Figure 3:
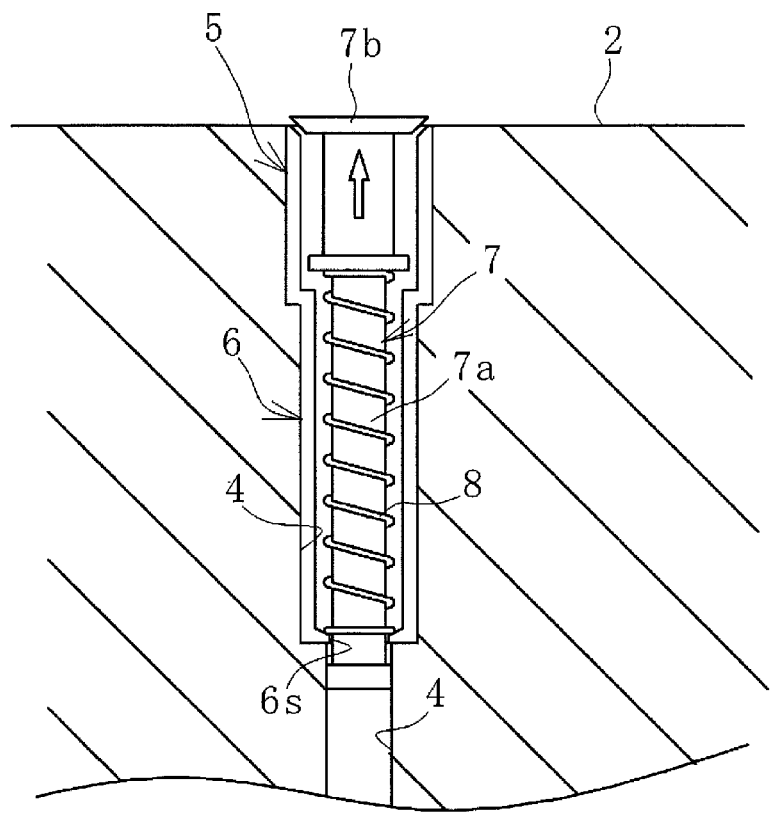
FIG. 3 is a partially enlarged view of FIG. 2.

A tire vulcanization mold 1 (hereinafter referred to as a mold 1) illustrated in FIGS. 1 to 3 is produced by the method for producing a tire vulcanization mold of the present technology. This mold 1 is a sector mold of a sectional type mold. Various groove molding portions 3 are provided so as to project from a tire molding surface 2.

The mold 1 is formed with an exhaust hole 4 for discharging unnecessary gas or the like generated during vulcanization of a green tire to the outside of the mold 1 to prevent a vulcanization failure, and one end of the exhaust hole 4 is open at a predetermined position Pm on the tire molding surface 2. A vent unit 5 is installed in the exhaust hole 4. That is, the vent unit 5 is installed at the predetermined position Pm on the tire molding surface 2.

As illustrated in FIG. 3, the vent unit 5 has a case 6, and a valve body 7 and a spring 8 built in the case 6. The case 6 is a cylindrical body, and the valve body 7 has a shaft portion 7a and an enlarged-diameter portion 7b fixed to the tip of the shaft portion 7a. The valve body 7 is constantly urged to the opening on one side of the case 6 by the spring 8 externally inserted to the shaft portion 7a. The enlarged-diameter portion 7b slightly protrudes from the tire molding surface 2, and when the enlarged-diameter portion 7b is positioned opening the exhaust hole 4 in this way, the inside and the outside of the mold 1 communicate through the exhaust hole 4. During vulcanization of the green tire, the valve body 7 is pressed by the green tire and retracts against the urging force of the spring 8. When the enlarged-diameter portion 7b is positioned blocking the opening at one end of the exhaust hole 4, the communication between the inside and the outside of the mold 1 through the exhaust hole 4 is cut off.

Figure 4:
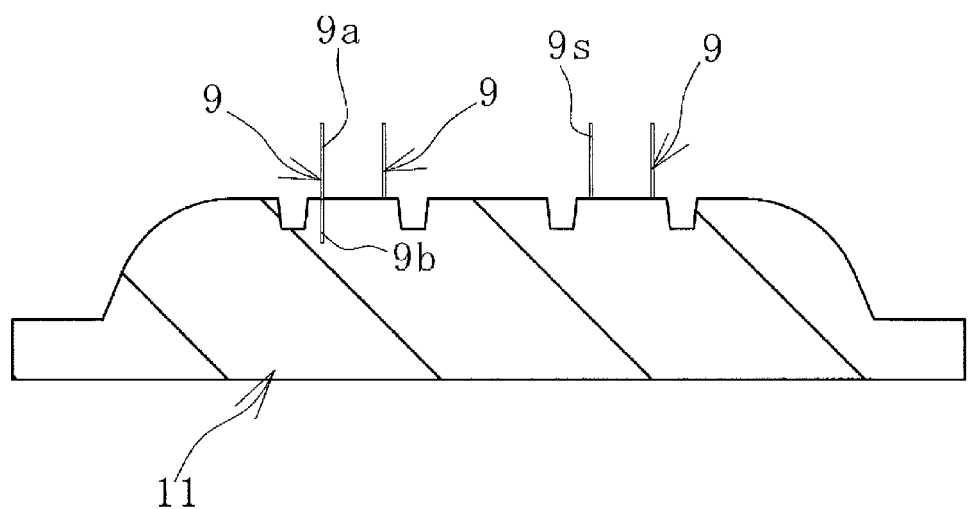
FIG. 4 is an explanatory diagram illustrating a master mold in a cross-sectional view.

In order to produce this mold 1, first, a master mold 11 illustrated in FIG. 4 is produced. The master mold 11 has the same surface shape as the tire surface of the tire to be produced. A rear end 9b of a positioning member 9 is embedded at an attachment position Pc on the surface of the master mold 11, and a tip end 9a is installed so as to project from the surface. This attachment position Pc is a position corresponding to the predetermined position Pm of the mold 1 in which the vent unit 5 is installed.

The positioning member 9 is, for example, a rod-shaped body, and can be produced using a metal such as stainless steel, iron, aluminum, or an aluminum alloy, various resins, or the like. A screw portion 9s is formed at least at the tip end 9a of the positioning member 9. The screw portion 9s may be formed over the entire length of the positioning member 9.

Figure 5:
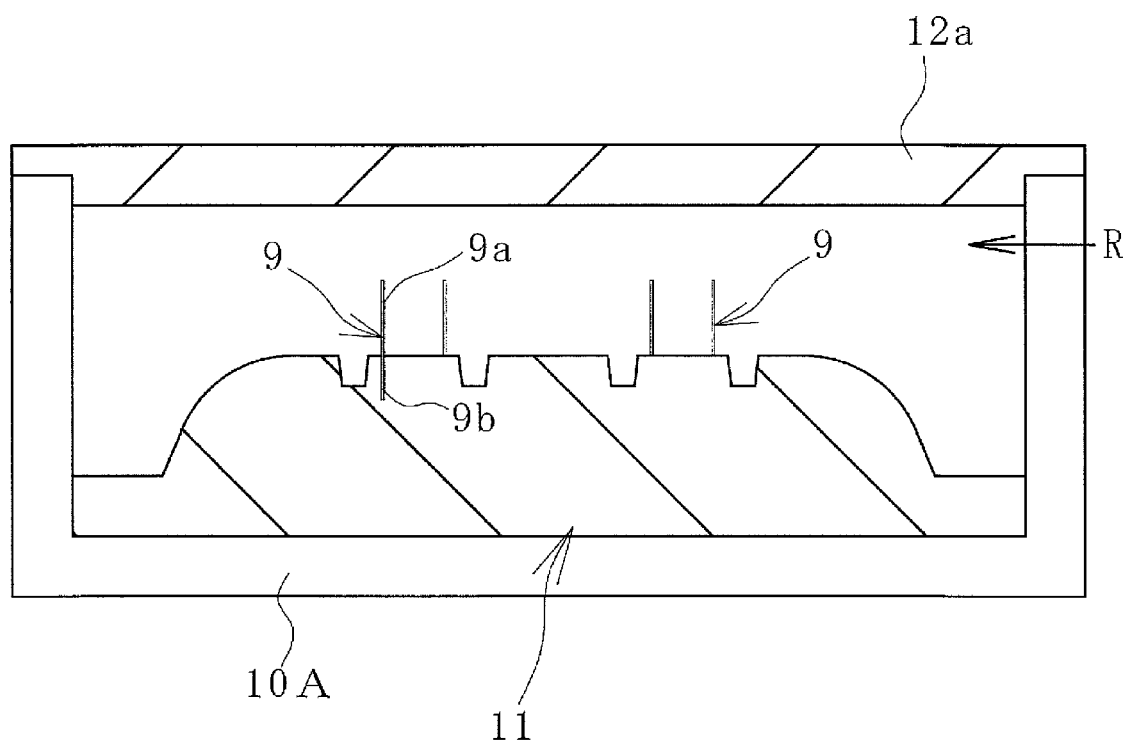
FIG. 5 is an explanatory diagram illustrating a process of producing a rubber mold in a cross-sectional view.
Figure 6:
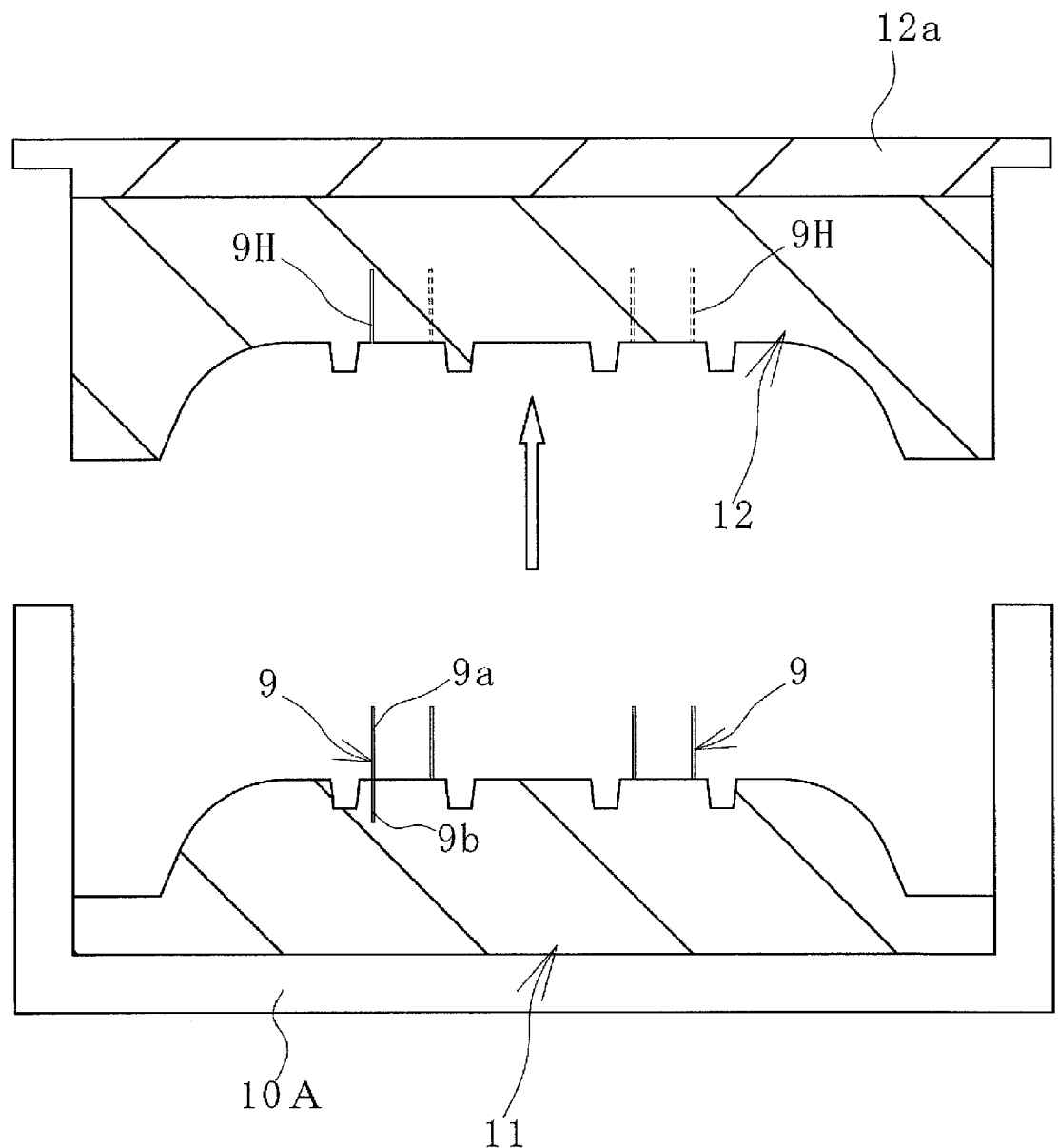
FIG. 6 is an explanatory diagram illustrating a state in which the produced rubber mold is separated from the master mold in a cross-sectional view.

Next, as illustrated in FIGS. 5 to 6, a rubber mold 12 to which the surface of the master mold 11 is transferred is produced using the master mold 11. Therefore, as illustrated in FIG. 5, the master mold 11 is arranged inside a mold frame 10A with the surface facing upward. A backup plate 12a is arranged above the mold frame 10A so that the surface of the backup plate 12a and the surface of the master mold 11 face each other. A rubber material R is poured and filled in the space between the surface of the backup plate 12a and the surface of the master mold 11 facing each other. When the filled rubber material R is solidified, the rubber mold 12 to which the surface of the master mold 11 is transferred is produced.

As illustrated in FIG. 6, the produced rubber mold 12 is separated from the master mold 11. A positioning hole 9H is formed in the surface of the produced rubber mold 12 by the tip end 9a. The positioning member 9 remains erected on the surface of the master mold 11.

Figure 7:
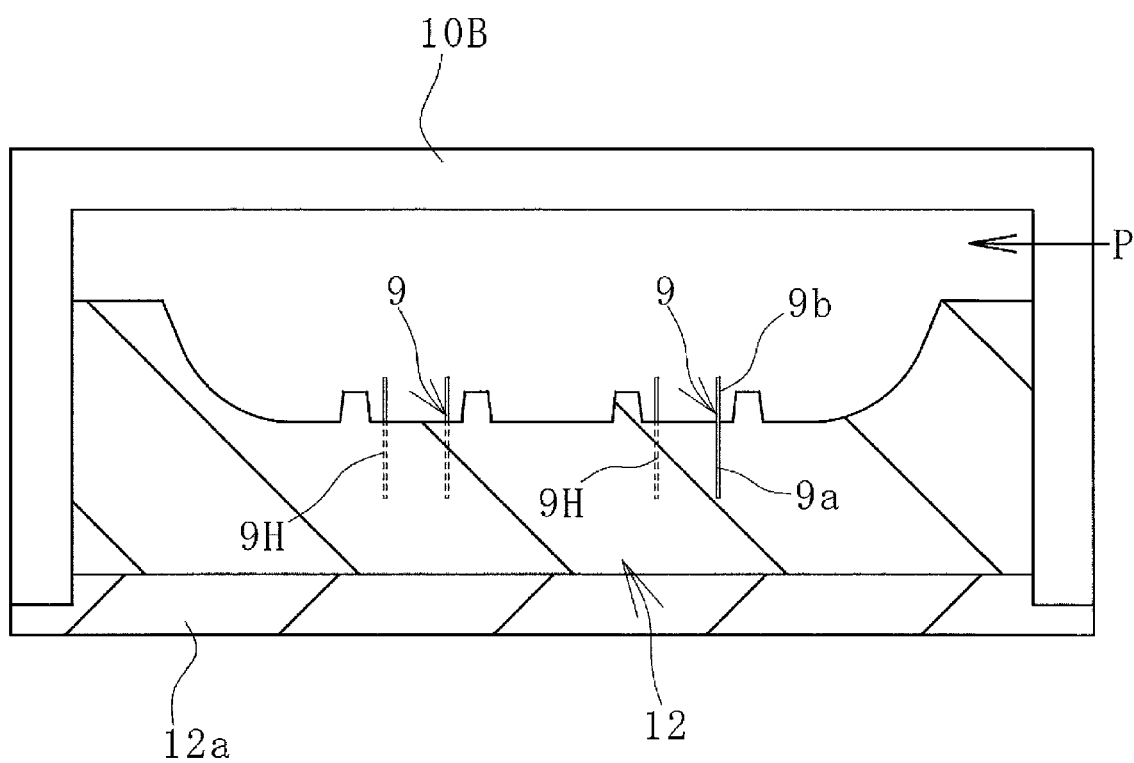
FIG. 7 is an explanatory diagram illustrating a process of producing a plaster mold in a cross-sectional view.
Figure 8:
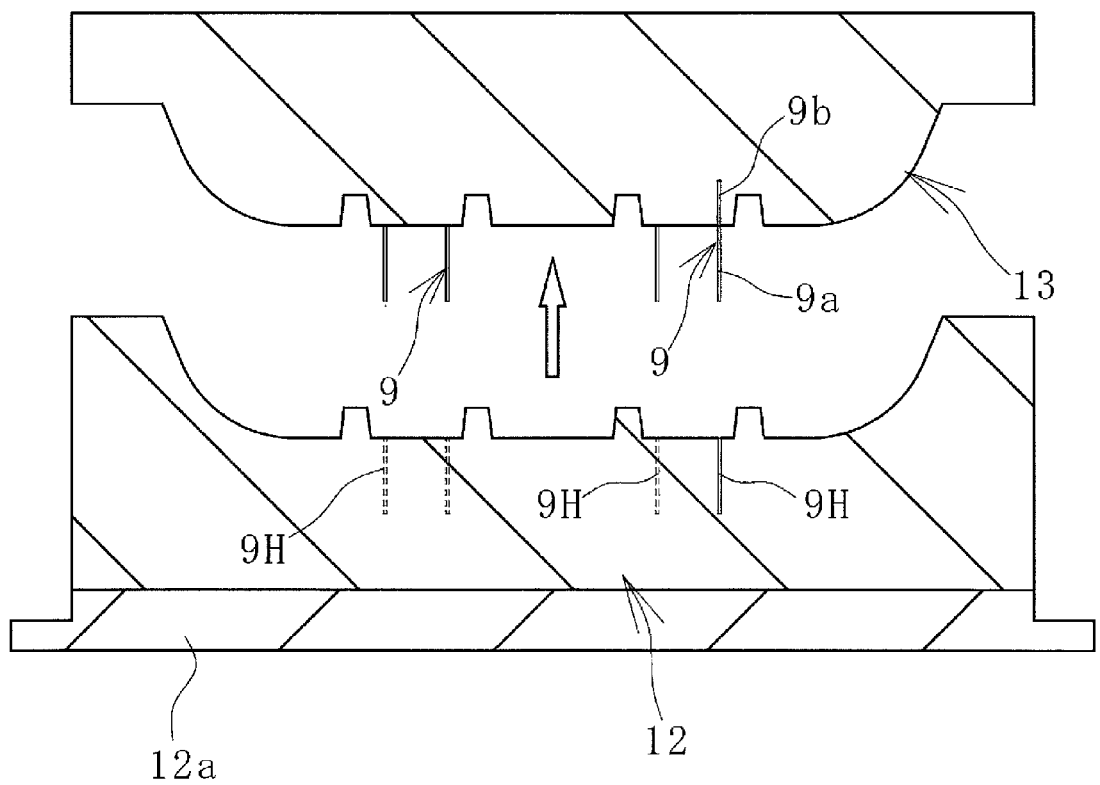
FIG. 8 is an explanatory diagram illustrating a state in which the produced plaster mold is separated from the rubber mold in a cross-sectional view.

Next, as illustrated in FIGS. 7 to 8, a plaster mold 13 to which the surface of the rubber mold 12 is transferred is produced. Therefore, the positioning member 9 removed from the master mold 11 is attached to the produced rubber mold 12. Specifically, the tip end 9a is embedded in the positioning hole 9H so that the rear end 9b protrudes from the surface of the rubber mold 12.

Then, the rubber mold 12 is placed in a mold frame 10B with the backup plate 12a in close contact with the back surface. Plaster P is poured onto the surface of the rubber mold 12. When the poured plaster P is solidified, the plaster mold 13 to which the surface of the rubber mold 12 is transferred is produced.

As illustrated in FIG. 8, the produced plaster mold 13 is separated from the rubber mold 12. The rear end 9b of the positioning member 9 is embedded in the plaster mold 13, and the tip end 9a is in a state of protruding from the surface of the plaster mold 13.

Figure 9:
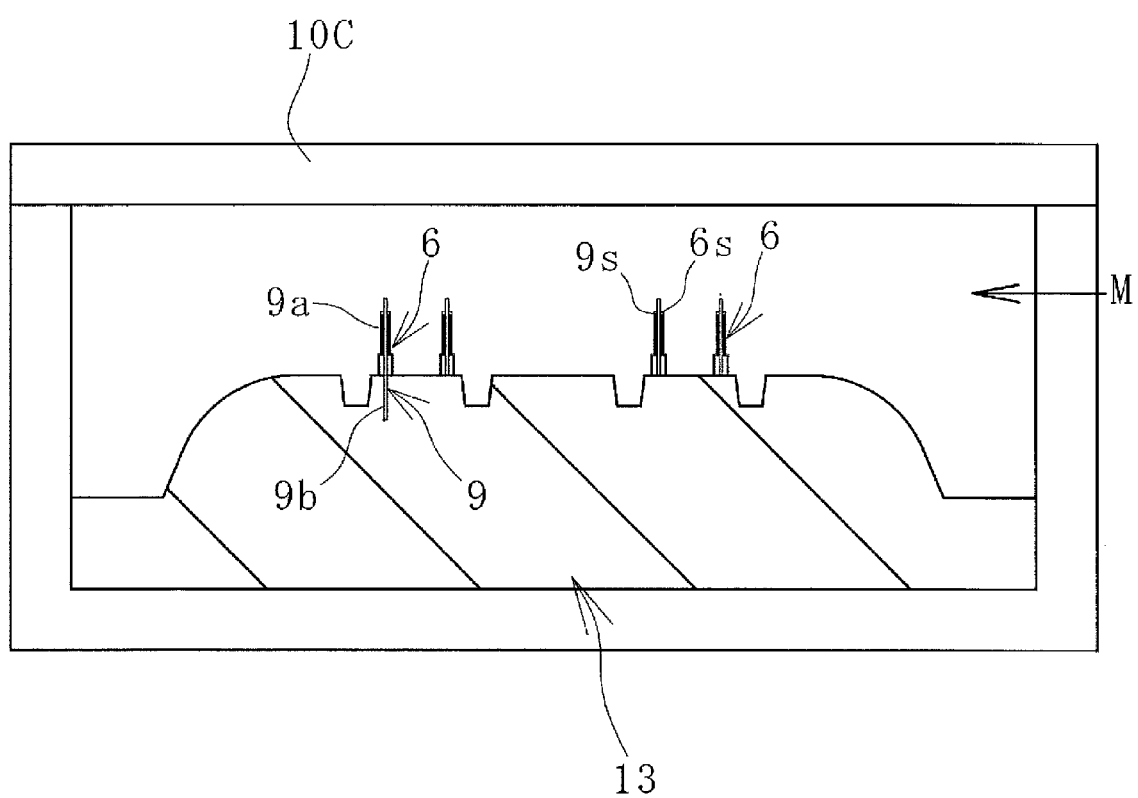
FIG. 9 is an explanatory diagram illustrating a process of casting a mold in a cross-sectional view.
Figure 10:
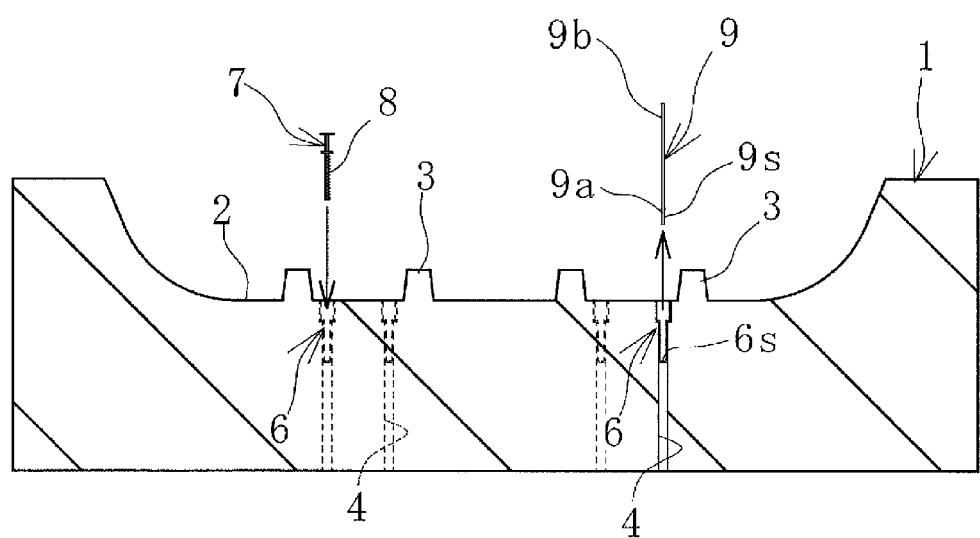
FIG. 10 is an explanatory diagram illustrating a cast mold in a cross-sectional view.

Next, as illustrated in FIGS. 9 to 10, the mold 1 to which the surface of the plaster mold 13 is transferred is cast. Therefore, the case 6 is detachably fixed to the tip end 9a protruding from the surface of the plaster mold 13. That is, the screw portion 9s of the positioning member 9 and the screw portion 6s of the case 6 are engaged together so that the case 6 is detachably fixed to the positioning member 9.

The plaster mold 13 is placed in a mold frame 10C with the surface facing upward. Then, for example, a molten metal M such as an aluminum material is poured onto the surface of the plaster mold 13. When the poured molten metal M is solidified, the mold 1 to which the surface of the plaster mold 13 is transferred is cast. After the molten metal M is solidified, the mold 1 is separated from the plaster mold 13.

The case 6 is cast into the mold 1 and fixed. The surface of the cast mold 1 becomes the tire molding surface 2, and the groove molding portion 3 is formed on the tire molding surface 2. Since the positioning member 9 is fixed to the case 6, the screw portions 6s and 9s are disengaged, and the positioning member 9 is removed from the case 6 as illustrated in FIG. 10. After that, the spring 8 is inserted and attached together with the valve body 7 to the case 6 from which the positioning member 9 is removed. The exhaust hole 4 communicating with the inside of the case 6 is formed at an appropriate timing by drilling or the like from the back surface side of the mold 1.

As described above, at the first stage of the process of producing the mold 1, the tip end 9a of the positioning member 9 is installed at the attachment position Pc corresponding to the predetermined position Pm on the surface of the master mold 11 so as to protrude. The case 6 can be cast into the mold 1 and fixed at the predetermined position Pm with high accuracy using the positioning member 9. Then, after removing the positioning member 9 from the case 6 cast in the mold 1, the valve body 7 is inserted into the case 6 and attached, so that the vent unit 5 can be installed at the predetermined position Pm on the tire molding surface 2 with high accuracy without requiring a large number of man-hours.

In the present embodiment, since the case 6 and the positioning member 9 have the screw portions 6s and 9s that engage with each other, the case 6 can be easily detachably fixed to the positioning member 9 in the process illustrated in FIG. 9. Further, in the process illustrated in FIG. 10, the positioning member 9 can be easily removed from the case 6.

Figure 11:
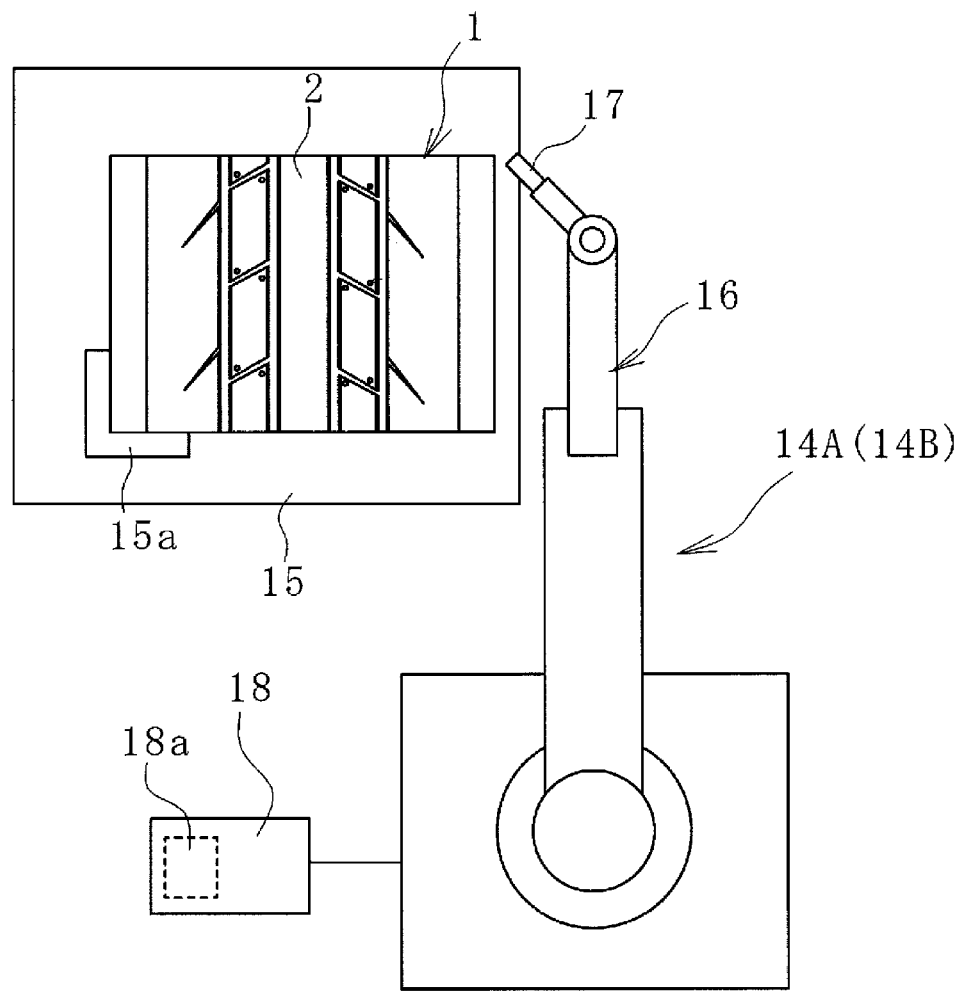
FIG. 11 is an explanatory diagram illustrating a valve body attachment mechanism and a vent unit maintenance mechanism in a plan view.
Figure 12:
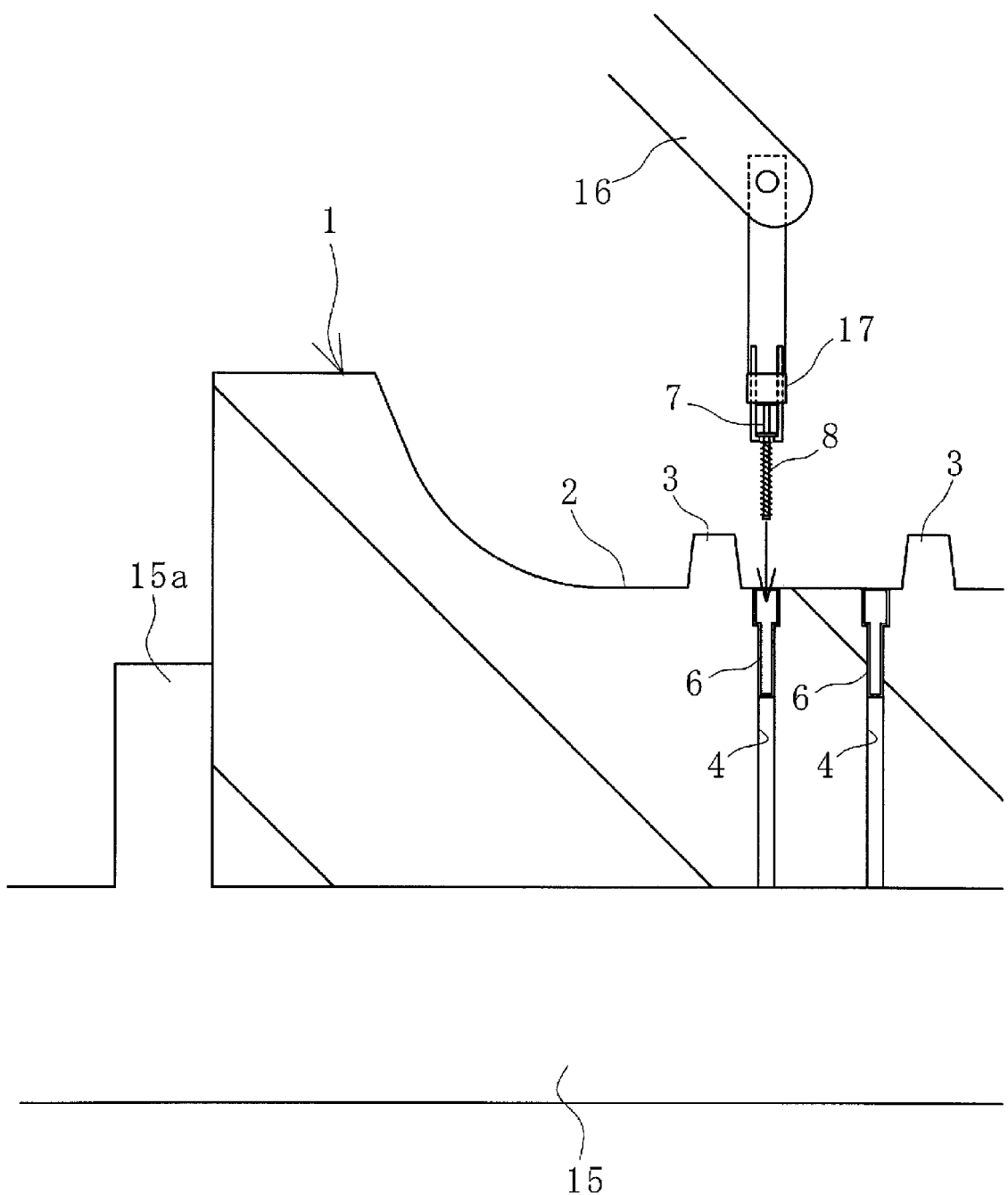
FIG. 12 is an explanatory diagram illustrating a process of attaching a valve body in a cross-sectional view.

The process of attaching the valve body 7 and the spring 8 to the mold 1 can be performed manually, but can also be performed using an attachment mechanism 14A as illustrated in FIGS. 11 and 12. The attachment mechanism 14A has a base 15 on which the cast mold 1 is placed, a robot arm 16, a head 17, and a control device 18. The robot arm 16 is configured by rotatably connecting a plurality of arm portions. A head 17 is attached to the tip end of the robot arm 16. A computer is used as the control device 18. The control device 18 has a storage unit 18a. The storage unit 18a stores the position data of the attachment position Pc in the master mold 11 and the shape data of the master mold 11. The movement of the robot arm 16 is controlled by the control device 18. In the present embodiment, as the head 17, a gripping head for gripping the valve body 7 to which the spring 8 is externally inserted is used.

The base 15 is provided with a guide 15a for mounting the mold 1 by aligning the reference point and the direction of the mold 1 as desired. For example, an L-shaped protrusion that abuts on the side surface of a corner of the mold 1 is used as the guide 15a. By placing the mold 1 on the base 15 in this way, the coordinate axes of the position data of the attachment position Pc in the master mold 11 stored in the storage unit 18a coincide with the coordinate axes of the mold 1 on the base 15.

After that, as illustrated in FIG. 12, the head 17 is moved based on the position data of the attachment position Pc stored in the storage unit 18a. Since the position data of the attachment position Pc indicates the position of the mold 1 where each case 6 is installed, the head 17 can be moved to the predetermined position Pm of the mold 1 where each case 6 is installed with high accuracy by controlling the movement of the head 17 via the robot arm 16 in this way. Then, the valve body 7 and the spring 8 are inserted into and attached to the case 6 by moving the head 17 close to the case 6 at the predetermined position Pm. As a result, the mold 1 in which the vent unit 5 illustrated in FIGS. 1 to 3 is installed at the predetermined position on the tire molding surface 2 is completed.

When the green tire is vulcanized by repeatedly using the mold 1, contaminant X adheres to the vent unit 5. If the amount of deposited contaminant X increases, the venting by the vent unit 5 may not function normally and a vulcanization failure may occur. Therefore, a cleaning operation for removing the contaminant X adhering to the vent unit 5 in a timely manner is required.

Figure 13:
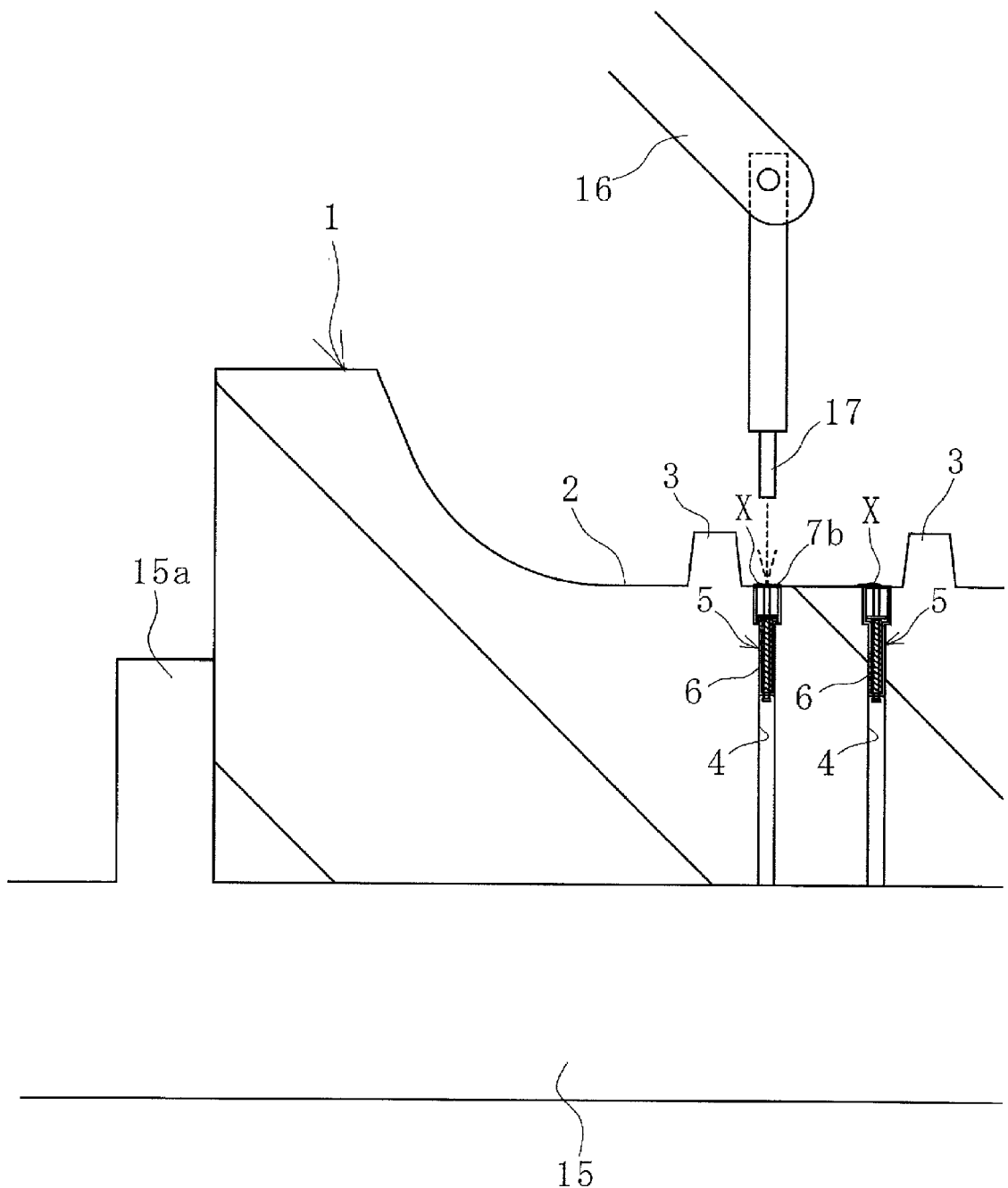
FIG. 13 is an explanatory diagram illustrating a process of cleaning a vent unit in a cross-sectional view.

Therefore, as illustrated in FIGS. 11 and 13, a maintenance mechanism 14B is used to perform maintenance work on the mold 1. In this maintenance mechanism 14B, only the head 17 of the attachment mechanism 14A described above is replaced. In the present embodiment, as the head 17, a cleaning head for removing the contaminant X adhering to the vent unit 5 is used.

When performing maintenance of the vent unit 5, as described above, the mold 1 is placed on the base 15 by aligning the coordinate axes of the position data of the attachment position Pc in the master mold 11 stored in the storage unit 18a so as to coincide with the coordinate axes of the mold 1 on the base 15. After that, as illustrated in FIG. 13, the head 17 is moved based on the position data of the attachment position Pc stored in the storage unit 18a.

Since the position data of the attachment position Pc indicates the position of the mold 1 where each case 6 (vent unit 5) is installed, the head 17 can be moved to the predetermined position Pm of the mold 1 in which each case 6 (vent unit 5) is installed with high accuracy by controlling the movement of the head 17 via the robot arm 16 in this way. Then, the head 17 performs a process of removing contaminant X from the vent unit 5 at the predetermined position Pm.

For example, the head 17 moved slightly above the vent unit 5 irradiates the vent unit 5 with a laser beam to remove the contaminant X adhering to the surface of the enlarged-diameter portion 7b and its surroundings, and the gap between the enlarged-diameter portion 7b and the tire molding surface 2. Alternatively, plasma is irradiated and compressed fluid is injected from the head 17 to remove the contaminant X. In addition, various known heads 17 for removing the contaminant X can be used. The head 17 can be quickly moved to the position of the vent unit 5 to perform the necessary maintenance work without performing processes such as detecting the position of the vent unit 5 each time the maintenance of the vent unit 5 is performed.

As the maintenance work, in addition to removing the contaminant X, the valve body 7 and the spring 8 may be replaced. When performing this work, for example, the spring 8 is pulled out from the case 6 together with the valve body 7 using a pull-out head that is caught or stuck in the enlarged-diameter portion 7b as the head 17. Then, using a gripping head as the head 17, a new valve body 7 and a spring 8 are inserted into the case 6 and replaced.

The present technology is not limited to the sectional type mold, but can also be applied to a so-called two-split type mold. Further, the present technology can be applied not only to a mold for producing a pneumatic tire but also to a mold for producing various other types of tires.

The invention claimed is:

1. A method for producing a tire vulcanization mold, comprising:

producing a master mold having a same surface shape as a tire surface to be produced;

subsequently producing a rubber mold to which a surface of the master mold is transferred;

subsequently casting a plaster mold to which a surface of the rubber mold is transferred;

subsequently casting a vulcanization mold to which a surface of the plaster mold is transferred; and subsequently installing a vent unit at a predetermined position on a tire molding surface of the vulcanization mold, wherein the vent unit has a case that opens to the tire molding surface, and a valve body and a spring built in the case, the case being a cylindrical body having a screw portion at a rear end and an enlarged-diameter at a front end, an opening portion of the case positioned in the tire molding surface is tapered with diameter being enlarged toward the tire molding surface, the valve body has a shaft portion and an enlarged-diameter portion fixed to a tip of the shaft portion, and is designed so that a tapered surface of the enlarged-diameter portion faces a tapered opening portion of the case, a tip end of a positioning member at an attachment position corresponding to the predetermined position on the surface of the master mold is installed protruding, the positioning member is a rod-shaped body with a screw portion formed at least in the tip end;

the rubber mold is produced using the master mold so that a positioning hole is formed in the rubber mold by the tip end;

the tip end of the positioning member removed from the master mold is embedded in the positioning hole with a rear end of the positioning member protruding from the surface of the rubber mold;

the plaster mold is produced using the rubber mold so that the rear end is embedded in the plaster mold with the tip end protruding from the surface of the plaster mold;

the screw portion of the case is engaged to the screw portion of the tip end of the positioning member so that the case is detachably fixed to the rear end of the positioning member and the front end of the case abuts on the surface of the plaster mold;

the vulcanization mold is cast using the plaster mold so that the case is cast and fixed to the vulcanization mold; and the valve body and the spring are inserted and attached to the case removed from the positioning member so that the tire molding surface is installed in the vent unit.

* * * * *